United States Patent [19]

Catanzaro et al.

[11] 4,283,062
[45] Aug. 11, 1981

[54] HYDRAULIC INJECTION MOLDING MACHINE STUFFING BOX

[75] Inventors: James R. Catanzaro; August R. Meyer, both of Cincinnati; David L. Willis, Hillsboro, all of Ohio

[73] Assignee: Cincinnati Milacron Inc., Cincinnati, Ohio

[21] Appl. No.: 106,968

[22] Filed: Dec. 26, 1979

[51] Int. Cl.³ .............................................. F16J 15/18
[52] U.S. Cl. ....................................... 277/12; 277/11; 277/105; 277/124; 92/168
[58] Field of Search ............ 425/107, 589, 451, 451.2, 425/542; 277/102, 103, 112, 105, 123–125, 9, 11, 12; 92/165 R, 166–168

[56] References Cited

U.S. PATENT DOCUMENTS

| 770,016 | 9/1904 | Miller | 92/165 R |
|---|---|---|---|
| 2,495,871 | 1/1950 | Stewart | 277/11 |
| 2,657,633 | 11/1953 | Baker et al. | 277/9 X |
| 2,899,938 | 8/1959 | Gardner | 92/168 X |
| 3,419,280 | 12/1968 | Wheeler | 277/123 |
| 3,577,833 | 5/1971 | Skelton | 92/168 |
| 3,905,742 | 9/1975 | McCarty | 425/451.2 |
| 4,038,015 | 7/1977 | Dawson | 425/451 X |
| 4,047,871 | 9/1977 | Hehl | 425/451.2 X |
| 4,099,905 | 7/1978 | Nash et al. | 425/542 X |
| 4,225,143 | 9/1980 | Hannah | 277/11 |

FOREIGN PATENT DOCUMENTS

| 180988 | 1/1907 | Fed. Rep. of Germany | 277/124 |
|---|---|---|---|
| 563573 | 8/1944 | United Kingdom | 277/11 |

*Primary Examiner*—Robert S. Ward, Jr.
*Attorney, Agent, or Firm*—Daniel P. Worth

[57] ABSTRACT

A stuffing box as applied to the sliding joint between the piston (ram) and cylinder of a hydraulic ram assembly in a hydraulic injection molding machine has a packing retainer assembly with a retainer ring with a protruding gland that extends into the stuffing box thereby to act as a pilot means to insure concentricity between the stuffing box, gland, and ram. In addition, the inside diameter of the gland has a support bushing groove in which is mounted a support bushing that has an inside diameter less than the inside diameter of the gland and which is fitted in sliding bearing relationship to the outside diameter of the ram and held there by the gland. The support bushing is preferably manufactured in two pieces from a fiber reinforced low friction resin selected from the class consisting of thermosetting resin and thermoplastic resin more preferably phenol formaldehyde and polytetrafluoroethylene.

23 Claims, 5 Drawing Figures

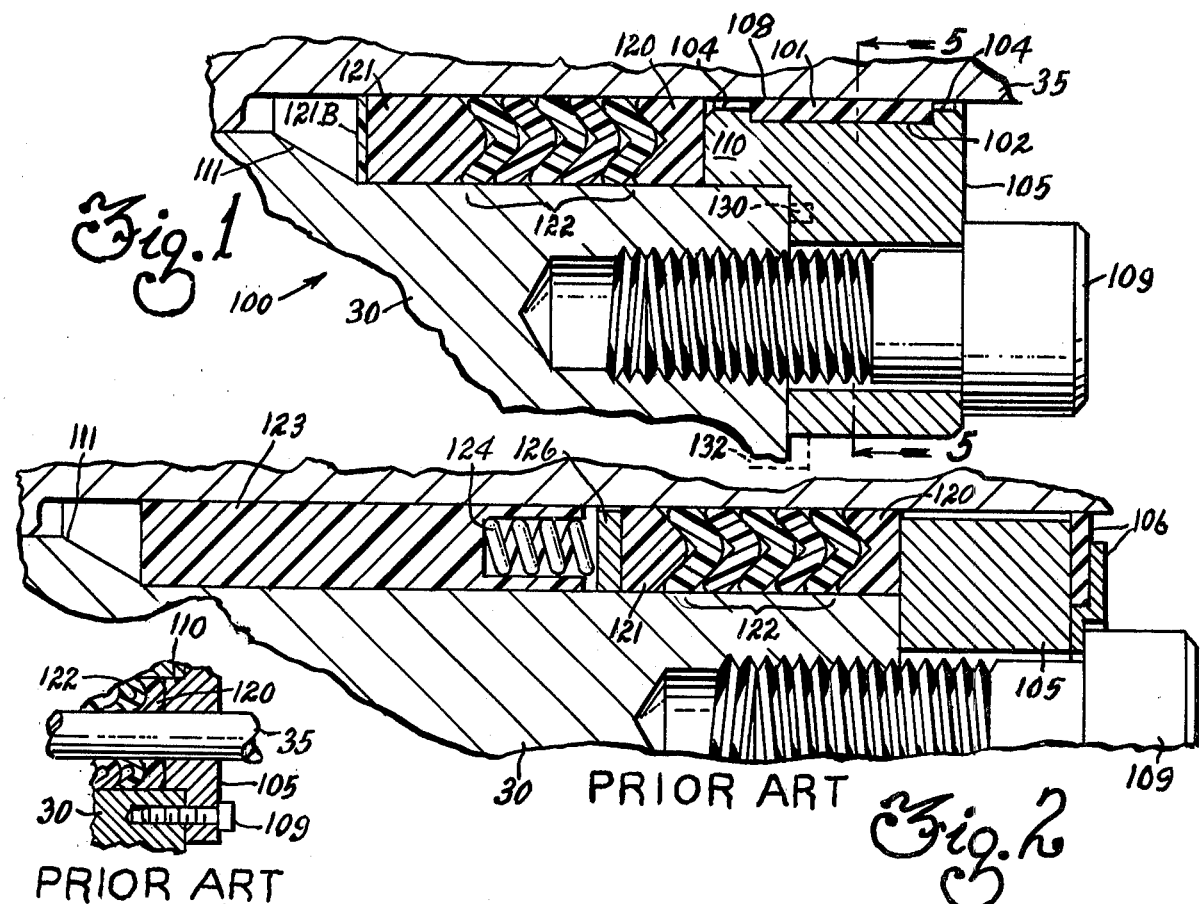
Fig. 1
Fig. 2 PRIOR ART
Fig. 3 PRIOR ART
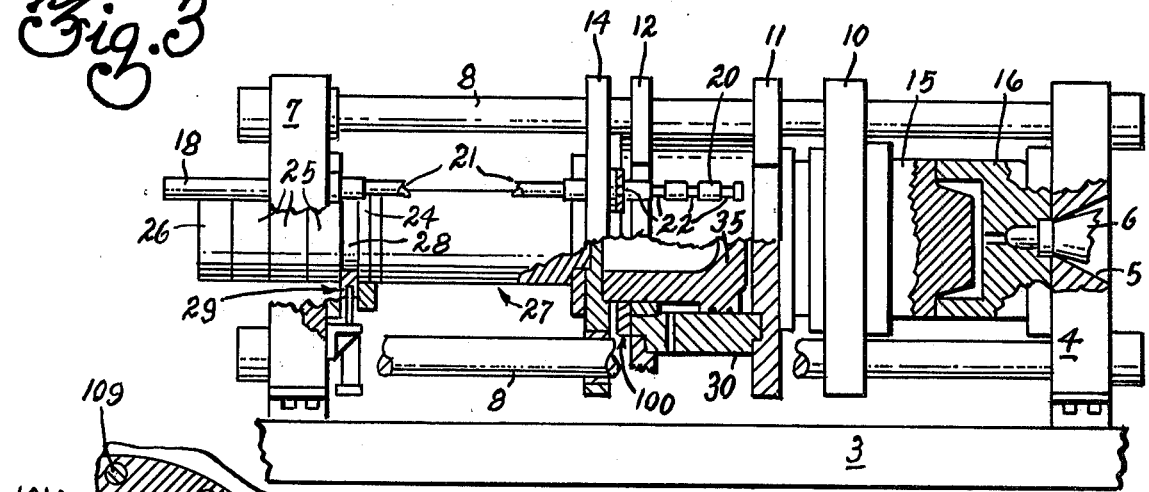
Fig. 4 PRIOR ART
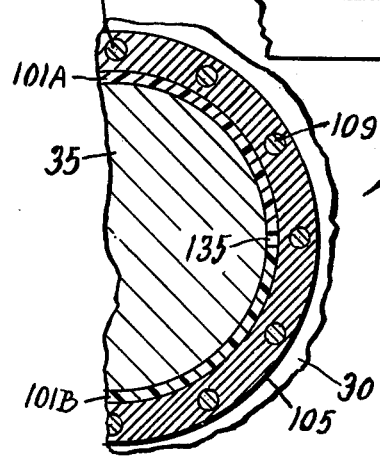
Fig. 5

HYDRAULIC INJECTION MOLDING MACHINE STUFFING BOX

SUMMARY AND BACKGROUND OF INVENTION

The present invention relates to an improved stuffing box assembly for the sliding joint between the piston (ram) and cylinder of the hydraulic ram portion of a hydraulic press such as a hydraulic injection molding machine for molding articles from resin. One aspect of the invention provides a sliding bearing supported between the gland and the ram. An aspect of the invention relates to an improvement of the foresaid having a liner bearing material selected from the class consisting of thermosetting and thermoplastic resin. One aspect of the invention is an improved stuffing box assembly for the sliding joint between the piston and the cylinder of the hydraulic ram unit in a horizontally disposed hydraulic injection molding machine, and the combination therewith, in connection with which the invention will be described.

Hydraulic injection molding machines for molding articles and products of synthetic resin are characteristically arranged to operate on a horizontal axis and to hydraulically close and hold closed the mold portion. Also, characteristically, one of the mold portions is mounted on a fixed platen through which the injection unit is connected to deliver molten plastic into the mold cavities. The other mold part is characteristically mounted on a moving platen suspended from tie rods along which it slides. The moving platen is actually reciprocated by the ram of the hydraulic ram part of the system.

The ram is usually of quite large diameter and weight, e.g. 13.62 inches and 1,560 pounds on a machine exerting 150 tons clamping force, 21.75 inches and 6,600 pounds on a machine exerting 500 tons clamping force, and 30.25 inches and 4,000 pounds on a machine exerting 1000 tons clamping force.

The present invention is addressed to the stuffing box which seals between the ram and hydraulic cylinder. This particular joint has in the past leaked due to such factors as: the pressures that must be resisted in building up the clamping tonnage of the machine; sticking or "stiction" requiring increased force or tonnage to open an injection mold after a molding operation; possible damage to the ram from nicks, galling and scoring; and entry of contaminants including dirt particles, and the like, into the packing due to inadequate wiping of the ram. The size and weight of the ram being handled aggravate problems encountered in assembling and maintaining such a system.

Accordingly, it is one objective of the present invention to provide an improved stuffing box assembly for a hydraulic injection molding machine for molding articles from resin and/or more broadly to provide the same for a hydraulic press.

An objective is to provide an improved packing retainer assembly for a stuffing box on a hydraulic injection molding machine.

Accordingly, the present invention contemplates the combination with a hydraulic injection molding machine for molding articles from synthetic resin of a stuffing box at the hydraulic ram portion thereof to enhance the sealing and wiping of the sliding joint between the ram and cylinder there. Such a stuffing box has packing disposed therewithin in an annular outer recess at the end of the cylinder in engagement with the ram and of the kind which expands radially inward against the ram in response to axial compression by a gland or packing retainer ring. The invention in such context further comprises a pilot means to obtain concentricity connected between the gland and stuffing box and preferably comprising a pilot shoulder or hub protruding from the gland to within the stuffing box, a support bushing groove on the inside diameter of the gland and a support bushing supported in the groove and having an inside diameter less than the inside diameter of the gland. The support bushing is preferably made of a synthetic resin and even more preferably made from a fiber reinforced synthetic resin. The resin preferably is selected from a class consisting of Teflon (tetraflouroethyline resins and flourinated ethyline-propylene resins) and phenol formaldehyde or more broadly thermoplastic and thermosetting resins. Again, preferably, the resin is fiber reinforced with linen, cotton, wool, or other nonabrasive cellulosic and keratin fibers.

The invention also contemplates a stuffing box constructed as aforesaid for use in a hydraulic ram portion of a hydraulic press preferably in a hydraulic injection molding machine.

Other objectives, advantages and features of the present invention will be realized from reading the following specification in conjunction with the drawings wherein:

FIG. 1 is a cross-section of a stuffing box assembly according to the invention wherein dotted lines at 130 and 132 respectively show modifications that are less preferred;

FIG. 2 illustrates one version of prior art stuffing box;

FIG. 3 illustrates another version of prior art stuffing box;

FIG. 4 is copied from FIG. 4 of U.S. Pat. No. 4,038,015 and illustrates an injection molding machine of the type with which the present improved stuffing box is combined; and FIG. 5 is an end view along 5—5 of FIG. 1.

The same reference members are used throughout the drawings to refer to the same parts or to similar parts, mutatis mutandis, where a modification or prior art is being described.

THE INVENTION—FIGS. 1 AND 5

Those readers interested in the prior art and in the background of the invention are referred to the description of FIGS. 2, 3 and 4 below.

Suffice it to say the present invention is applied to a stuffing box 100 as illustrated in FIG. 5.

Referring now to FIGS. 1 and 5, there is shown a stuffing box assembly 100 (FIG. 4 shows where it is on the machine) according to the present invention.

The hydraulic cylinder 30 (FIGS. 1 and 5) slidably supports the piston or ram 35 and provides a stuffing box 100 where the ram emerges from the cylinder. The ram 35 is supported by the cylinder 30, stuffing box assembly 100, and by the support plates 12,14 or by the moving platen 10 in some units. The plates and moving platen 10,11,12,14 are suspended from tie rods as shown in FIG. 4 (or, alternatively, on some machines may be supported by sliding means on ways). The ram and cylinder are horizontally arranged and the platen is horizontally stroked.

The support bushing 101 is supported in the bushing groove 102 which is a recess on the inside diameter 104 of a retaining ring or gland 105. It is important that the support bushing engage the ram in a linear or sliding bearing fashion and not merely engage it in a wiping manner. To this end, the support bushing 101 has a uniform thickness and the bushing groove 102 which runs around the inside diameter of the gland has a uniform depth. Further, the support bushing has an inside diameter 108 less than the inside diameter of the gland to the end that contact between the gland 105 (which is usually metallic, e.g., nodular cast iron) and the ram 35 (which is usually made of nodular cast iron) is avoided to thereby minimize nicks, galling, and other physical damage.

The gland 105 is secured to the end face of the cylinder by a plurality of socket head bolts 109. A pilot means 110 is formed by a protruding hub of annular shape at the center of the gland which extends within the stuffing box recess 111 of the cylinder and acts to locate and center the gland and ram during assembly and to compress the packing. This hub, or pilot 110 means also acts to compress the packing which is illustrated as having adjacent the gland a follower ring, 120 and at the opposite or far end of the stuffing box a header ring 121, and between the two follower and header rings, a packing means 122 preferably the kind of packing which expands radially inward against the ram in response to axial pressure between the two rings. The packing preferably is a plurality of chevron packing rings (illustrated) or similar devices which are also called sea-rings. If desired, a preload gasket 121B may be placed between the end of the stuffing box 100 and header ring to enhance the compression of the packing.

The support bushing 101 is preferably made in two arcuate pieces 101A,101B (FIG. 5) of plastic, more preferably from a fiber reinforced synthetic resin selected from the class consisting of thermoset and thermoplastic resins. Linen fiber reinforced phenol-formaldehyde or linen fiber reinforced nylon, tetrafluoroethylene (Teflon brand) are even more preferred. Other nonabrasive fibers may also be considered, e.g. cellulosic, cotton, wool or keratin.

Alternative designs for obtaining pilot means would be an annular ring protruding from the face of the cylinder into a matching groove as at dotted line 130 in the retainer ring or alternatively to have the retainer ring 105 outside diameter fit into a groove or recess in the face of the cylinder formed by a shoulder as at dotted line 132 FIG. 1. These are less desirable than using the pilot means 110 shown.

Thus, a ram support packing retainer assembly according to the invention has a gland 105 with pilot means 110 and a groove 102 with a bearing assembly 101 (101A, 101B) therein having an inside diameter less than the inside diameter of said gland thereby to achieve a bearing fit with the ram.

Environment to Which Invention Is Applied

It will be appreciated that FIG. 4 is copied from U.S. Pat. No. 4,038,015 and illustrates a representative environment in which the invention of the other Figs. is preferably used. Other U.S. patents illustrating representative environments are U.S. Pat. Nos. 3,905,742; 4,047,871; 4,099,905.

In FIG. 4 is shown a base plate 3 on which is mounted a fixed platen 4 having therein—as is commonly known—a nozzle entry port 5 to receive the nozzle 6 of the plastication and injection unit which latter are not illustrated. A backplate 7 is secured to the other end of the baseplate. A plurality of tie rods 8, ordinarily four arranged in rectangular and preferably square fashion extend between the fixed platen 4 and the backplate 7. Slidably mounted on the tie rods 8 are a moving platen 10, a front cylinder support plate 11, a rear cylinder support plate 12, and a ram support plate 14. As is wellknown the mold parts 15,16 are mounted respectively to the fixed and moving platens.

A pair of traversing cylinders 18 are mounted on the backplate symmetrically about the machine center line and provide means for rapidly advancing and retracting all the support plates and moving platens in order to open and close the mold. The front end 20 of the traverse cylinder rod 21 is fashioned with a plurality of grooves 22 cut therein to act as locating means so that the machine can be set up for molds of different heights. Four such grooves 22 are illustrated.

On the rear segment 23 (in FIG. 1 of U.S. Pat. No. 4,038,015) of the blocking ram 27 are a plurality of cast iron rings 24, 25, 25, 25, 26 spaced in such a way as to permit locking the ram by engaging the lock recess or space 28 with a pair of locks 29. Each of the traverse cylinder grooves 22 has a corresponding lock opening or space 28 between two of the rings. Thus, there are a face ring 24, three slidable rings 25, one retaining ring 26 to provide four positions for space 28, each position corresponding and coacting with one of the four traverse rod grooves 22. The respective groove 22 and recess 28 are selected when the machine is being set up for a particular mold with its particular height adjustment.

Thus, the recess 28 is defined immediately to the rear of the lock engaging rear face on whichever ring becomes the compression ring when the system is operational. For example, in FIG. 4, the rear face of ring 24 is immediately adjacent the recess and the other side of the recess is defined by the front face of ring 25.

A hydraulic cylinder 30 is supported between the two cylinder support plates 11,12. This cylinder 30 moves forward (responsive to the traverse cylinders) relative to the locked-in-place-ram to carry with it the moving platen, thereby closing the mold 15,16 and maintaining pressure sufficient to hold the mold closed during an injection operation.

Within the cylinder is a hydraulic piston 35, sometimes called a pancake piston. The blocking ram 27 is secured into the rear of this piston 35. The forward end 37 of the blocking ram is also mounted on the ram support plate 14 while the rear end of the blocking ram with the locking rings 24 . . . 26 thereon passes through the back plate.

THE PRIOR ART OF FIG. 2

FIG. 2 illustrates a representative prior art stuffing box for the sliding joint between the ram and the hydraulic cylinder. A packing retainer ring 105 is secured with a plurality of bolts to the face of the cylinder and a wiper 106 made of felt or of the material commercially available from a number of sources, e.g. Chicago Rawhide Manufacturing Co. of Chicago, Illinois, is applied here to wipe off excess oil and to minimize the amount of dirt carried with the oil back into the packing.

Within the stuffing box is a ram bushing 123 made of phenolic, (phenol-formaldehyde resin, preferably fiber reinforced), a plurality of springs 124, and a spring retainer ring 126 and header ring 121 which are driven by the springs to expand the chevron packing rings into the sealing engagement with the cylinder. A follower ring 120 separates the retainer 105 from the chevron packing 122.

It should be observed that during assembly of the ram into the cylinder, it is necessary to place the large metal retaining ring 105 around the ram during assembly into the cylinder. The construction shown here in FIG. 2 has a high risk of contact between the retainer ring and ram during assembly and during subsequent maintenance operation requiring disassembly etc. The construction of FIG. 1 by comparison has far less danger of mechanical damage caused by the ring and ram contacting each other due to the separating function achieved by the support bushing as described in FIG. 2.

THE PRIOR ART OF FIG. 3

In this Fig. as with all others, the same reference numbers refer to the same parts. This Fig. illustrates a prior art packing installation which is well known for machine tools (which have normally smaller shafts or rams to deal with) and illustrates principally that packing glands are heretofore known to have the protruding hub 110 which may also serve as a pilot means.

OTHER

The use of the pilot hub 110 on the gland with very closely held tolerances here (e.g. ±0.001 inch on a 23.248 inch outside diameter of hub 110) achieves the self-alignment or concentricity. The employment of a support bushing 101 this far out in the stuffing box reduces the span of the ram which is unsupported. The use of plastic bearings with less inside diameter 108 minimizes the chance of galling and indeed, being softer material, permits the embedding of dirt particles in the bearing.

As illustrated in FIG. 5, a plurality of arcuate members 101A,101B form the support bushing. Preferably, only two arcuate members each comprising approximately 180 degrees of angular arc are used. In other words, two semicircular members are employed. The joint or crack 135 between the two members should not be at the bottom of the support groove but instead should be up on the side as illustrated in FIG. 5. This insures a proper film of lubricant in the bottom half of the bushing. Should the bottom half bushing member become worn, it can be shifted to the top and the top member moved to the bottom, thus simplifying maintenance. Some end clearance 135 between the halves of the bushing should be provided for thermal expansion. Approximately 3/16 of end clearance is provided on a ram having a 22 inch nominal ram diameter.

What is claimed is:

1. In a ram support packing retainer assembly for use in the stuffing box disposed at the sliding joint between the piston and the cylinder of a hydraulic ram in a hydraulic press such as a hydraulic injection molding machine for molding articles from resin and wherein said stuffing box has packing disposed within an annular outer recess at the end of the cylinder in engagement with the piston and of the kind which expands radially inward against the piston in response to axial compression by a gland or packing retainer ring, the improvement comprising:
concentricity pilot means to be connected between said gland and said stuffing box;
a support bushing groove on the inside diameter of said gland;
a support bushing supported in said groove and having an inside diameter less than the inside diameter of said gland.

2. In a ram support packing retainer assembly according to claim 1 the improvement further comprising:
said concentricity means including an axially extending hub on said gland that fits into the entry of said stuffing box in an axial manner to compress the packing therein and in a concentric manner to center said gland and said support bushing.

3. In a ram support packing retainer assembly according to claim 1 the improvement further comprising:
said support bushing being formed of synthetic resin.

4. In a ram support packing retainer assembly according to claim 1 the improvement further comprising:
said support bushing being formed from fiber reinforced synthetic resin.

5. In a ram support packing retainer assembly according to claim 1 the improvement further comprising:
said support bushing being formed from fiber reinforced synthetic phenolic resin.

6. In a ram support packing retainer assembly according to claim 1 the improvement further comprising:
said support bushing being formed from fiber reinforced synthetic resin selected from the class consisting of thermoset and thermoplastic resins.

7. In a ram support packing retainer assembly according to claim 1 the improvement further comprising:
said support bushing being formed from fiber reinforced synthetic resin selected from the class consisting of phenol formaldehyde resin, flourinated ethylene-propylene and tetraflouroethylene resins.

8. In a ram support packing retainer assembly in accordance with any one of claims 2, 4 and 6 the improvement further comprising:
said support bushing being formed of at least two arcuate members seated in said groove end-to-end with clearance for thermal expansion and to circumscribe such a piston as may be situated therein.

9. In a ram support packing retainer assembly according to claim 1 the improvement further comprising:
said concentricity means including an axially extending recess on said stuffing box to receive a corresponding axial portion of said gland thereby to obtain concentricity.

10. In a ram support packing retainer assembly according to claim 1 the improvement further comprising:
said groove having a substantially constant depth and said bushing a substantially constant thickness.

11. In combination with a hydraulic injection molding machine for molding articles from synthetic resin, a stuffing box assembly at the hydraulic ram to enhance the sealing and wiping of the sliding joint between the piston ram and cylinder there, said stuffing box having packing disposed within an annular outer recess at the end of the cylinder in engagement with the piston and of the kind which expands radially inward against the piston in response to axial compression by a gland or packing retainer ring the improvement comprising:
concentricity pilot means connected between said gland and said stuffing box;
a support bushing groove on the inside diameter of said gland;
a support bushing supported in said groove and having an inside diameter less than the inside diameter of said gland.

12. In a ram support packing retainer assembly according to claim 11 the improvement further comprising:

said concentricity means including an axially extending hub on said gland that fits into the entry of said stuffing box in an axial manner to compress the packing therein and in a concentric manner to center said gland and said support bushing.

13. In a ram support packing retainer assembly according to claim 11 the improvement further comprising:

said support bushing being made of synthetic resin.

14. In a ram support packing retainer assembly according to claim 11 the improvement further comprising:

said support bushing being formed from fiber reinforced synthetic resin.

15. In a ram support packing retainer assembly according to claim 11 the improvement further comprising:

said support bushing being formed from fiber reinforced synthetic phenolic resin.

16. In a ram support packing retainer assembly according to claim 11 the improvement further comprising:

said support bushing being formed from fiber reinforced synthetic resin selected from the class consisting of thermoset and thermoplastic resins.

17. In a ram support packing retainer assembly according to claim 11 the improvement further comprising:

said support bushing being formed from fiber reinforced synthetic resin selected from the class consisting of phenol formaldehyde resin, nylon, flourinated ethylene-propylene and tetraflouroethylene resins.

18. In a ram support packing retainer assembly in accordance with any one of claims 12, 14 and 16 the improvement further comprising:

said support bushing being formed of end-to-end at least two arcuate members seated in said groove end-to-end with end clearance for thermal expansion and said ram in a sliding bearing relationship.

19. In a ram support packing retainer assembly according to claim 11 the improvement further comprising:

said concentricity means including an axially extending recess on said stuffing box to receive a corresponding axial portion of said gland thereby to obtain concentricity.

20. In a ram support packing retainer assembly according to claim 11 the improvement further comprising:

said groove having a substantially constant depth and said bushing a substantially constant thickness.

21. In the improvement according to one of claims 4 and 14 the further improvement of fiber selected from the class consisting of linen, cellulosic, cotton, wool or keratin.

22. In the improvement according to one of claims 1 and 11, said support bushing being formed of Teflon.

23. In the improvement according to one of claims 1 and 11, said support bushing being formed of nylon.

* * * * *